United States Patent
Jones et al.

(10) Patent No.: US 10,114,397 B2
(45) Date of Patent: Oct. 30, 2018

(54) COLD LOAD PICKUP SUPPORT THROUGH LOCAL CONDITION DETECTION

(71) Applicant: Battelle Memorial Institute, Columbus, OH (US)

(72) Inventors: Michael A. Jones, Marysville, OH (US); Jason McCullough, Columbus, OH (US); Eric Rehberg, Westerville, OH (US)

(73) Assignee: BATTELLE MEMORIAL INSTITUTE, Columbus, OH (US)

( * ) Notice: Subject to any disclaimer, the term of this patent is extended or adjusted under 35 U.S.C. 154(b) by 248 days.

(21) Appl. No.: 15/091,973

(22) Filed: Apr. 6, 2016

(65) Prior Publication Data

US 2016/0299522 A1 Oct. 13, 2016

Related U.S. Application Data

(60) Provisional application No. 62/144,024, filed on Apr. 7, 2015.

(51) Int. Cl.
| | | |
|---|---|---|
| *G05F 1/66* | (2006.01) | |
| *G05B 15/02* | (2006.01) | |
| *G06F 11/07* | (2006.01) | |

(52) U.S. Cl.
CPC .............. *G05F 1/66* (2013.01); *G05B 15/02* (2013.01); *G06F 11/0721* (2013.01); *G06F 11/0793* (2013.01); *G05B 2219/2642* (2013.01)

(58) Field of Classification Search
CPC ... G05B 15/02; G05B 2219/2642; G05F 1/66; G06F 11/0721; G06F 11/0793

USPC .................................................. 700/286, 297
See application file for complete search history.

(56) References Cited

U.S. PATENT DOCUMENTS

| | | | |
|---|---|---|---|
| 2,700,757 A | 1/1955 | Bradley | |
| 3,946,243 A | 3/1976 | Anderson et al. | |
| 4,020,358 A * | 4/1977 | Wyland ............. | G05D 23/1913 236/46 R |
| 4,987,513 A * | 1/1991 | Shelley ................. | H01H 47/18 361/59 |

(Continued)

OTHER PUBLICATIONS

Bischke et al.; Design and Controlled Use of Water Heater Load Management; IEEE Transactions on Power Apparatus and Systems; vol. PAS-104; No. 6; pp. 1290-1293; Jun. 1985.

(Continued)

*Primary Examiner* — Chun Cao
(74) *Attorney, Agent, or Firm* — Fay Sharpe LLP (57) ABSTRACT

A cold load pickup device includes a load controller comprising a microprocessor or microcontroller. The device is programmed to detect restoration of power after a power outage on a circuit powering an electric load. A power outage time for the power outage is determined, and a startup delay for the electric load is determined based on the power outage time. A startup delay mechanism, such as a power relay operated by the load controller or switching of the load on/off by the load controller, is configured to apply the startup delay after the detected restoration of power before restarting the electric load. In some embodiments, the startup delay for the electric load is determined based on the power outage time and a startup delay versus power outage time curve stored in a non-volatile memory of the load controller.

7 Claims, 5 Drawing Sheets

(56) References Cited

U.S. PATENT DOCUMENTS

| | | |
|---|---|---|
| 7,839,027 B2 | 11/2010 | Shelton et al. |
| 8,121,742 B2 | 2/2012 | Flohr et al. |
| 8,178,997 B2 | 5/2012 | Talkin et al. |
| 8,204,633 B2 | 6/2012 | Harbin, III et al. |
| 8,234,876 B2 | 8/2012 | Parsonnet et al. |
| 8,271,143 B2 | 9/2012 | Deivasigamani et al. |
| 8,527,107 B2 * | 9/2013 | Forbes, Jr. ............ G06Q 10/00 323/299 |
| 8,912,683 B2 * | 12/2014 | Dames .................... H02J 3/14 307/38 |

OTHER PUBLICATIONS

CERTS—Load as a Reliability Resource in Restructured Electricity Markets; California Energy Commission, Consultant Report; Oct. 2003.

Gardner et al; Load Management DSM: Past, Present & Future; Proceedings of the Ninth Symposium on Improving Building Systems in Hot and Humid Climates; pp. 267-279; Arlington, TX; May 19-20, 1994.

Laurent et al.; A Column Generation Method for Optimal Load Management via Control of Electric Water Heaters; IEEE Transactions on Power Systems; vol. 10; No. 3; pp. 1389-1400; Aug. 1995.

Navid-Azarbaijani; Load Model and Control of Residential Appliances; Thesis submitted to the Faculty of Graduate Studies and Research; Department of Electrical Engineering, McGill University, Montreal, Canada; Aug. 1995.

NERC—Balancing and Frequency Control, A Technical Document Prepared by the NERC Resources Subcommittee; Jan. 26, 2011.

\* cited by examiner

COLD LOAD PICKUP SUPPORT THROUGH LOCAL CONDITION DETECTION

This application claims the benefit of U.S. Provisional Application No. 62/144,024 filed Apr. 7, 2015 and titled "COLD LOAD PICKUP SUPPORT THROUGH LOCAL CONDITION DETECTION". U.S. Provisional Application No. 62/144,024 filed Apr. 7, 2015 is incorporated herein by reference in its entirety.

BACKGROUND

The following relates to the electric power arts, electric power grid management arts, and related arts.

Power outages are an unfortunate reality with any electrical power grid. Such outages can have myriad causes, such as downed overhead lines, blown transformers, generator failures, and so forth. Due to the interconnectedness of the electrical power grid, these problems can cascade as an initial failure produces an overvoltage or overcurrent condition that leads to further failures. Cascading is ultimately arrested by various automatic circuit isolation mechanisms built into the electrical power grid.

A power outage can last anywhere from a few seconds or less, up to several days or longer. A short power outage is often corrected by automatic electric power grid recovery mechanisms, such as operating automatic switches to bypass a blown transformer or downed transmission line, and in this case the power outage usually has limited adverse effects (e.g. resetting some electric clocks to "12:00 am", or shutting off computers that do not include a battery backup).

Longer power outages are more problematic. The usually require human intervention to restore power. Additionally, a longer power outage adversely impacts loads that convert and store electrical energy in another form. Some examples of residential electric loads that store energy include: electric water heaters which store thermal energy in the form of heated water, heating, air conditioning, and ventilation (HVAC) systems which store energy in the form of a maintained temperature differential; refrigerators which also store energy as a maintained temperature differential; and electric vehicle charging stations which store electrochemical energy in a vehicle battery.

In response to a longer power outage, powerline technicians track down the cause of the power outage and take action to restore power. This is done as expeditiously as possible while maintaining technician safety. Conventionally, when power is restored on a given grid circuit, the restored power is delivered essentially instantaneously to all loads powered by that grid circuit. If those loads include energy storing loads (e.g. electric water heaters, HVAC, refrigerators, vehicle charging stations) then these loads often initially draw maximum power as they recharge, because during the extended power outage their supply of stored energy has typically been depleted. This simultaneous power draw can overload of the newly restored grid circuit causing a new power outage. Even if no new power outage is produced, the high initial power draw stresses the circuit which over time can lead to premature equipment failures.

Electrical power utilities, cognizant of this "cold load pickup" issue, sometimes restore power on a sub-circuit by sub-circuit basis in order to limit the power surges due to restarting energy storage loads. This is a variant on the "rolling blackout" concept. This approach is not targeted to particular types of loads, much less to particular individual loads, negatively impacts electrical customers, and can delay the total time to recover from an extended power outage.

The conventional "simultaneous startup" or "rolling startup" processes are a consequence of the conventional electric power grid delivery paradigm which is load-driven. As opposed to these load-driven approaches, in "demand response" approaches the electrical power demand is adjusted to better match available electrical power supply. Some simple demand response approaches rely upon incentivizing electrical power customers to operate their devices at times of off-peak demand, for example by pricing electrical power lower during off-peak hours.

More automated demand response techniques are being developed, in which the electrical supplier (e.g. the power company or other grid operator) can remotely control certain electric loads to operate during off-peak hours. In frequency control techniques, automated demand response is extended toward shorter time frames (e.g. on the order of minutes or seconds) to enable load power cycling to compensate for short-term loading changes that are reflected in changes to the instantaneous electrical frequency on the electric power grid.

Energy storage loads (e.g. electric water heaters, HVAC, refrigerators, vehicle charging stations) are particularly valuable as controlled loads for demand response systems because the stored energy provides flexibility as to when these loads operate. For example, an electric water heater typically has a "dead band" temperature range around its set point temperature, and conventionally the heater elements are shut off when the temperature exceeds the top of the dead band and are turned on when the temperature falls below the bottom of the dead band. Most of the time the temperature is within the dead band, and in this state the heater elements may be turned on or off for a secondary purpose such as frequency control, so long as the power cycling does not cause the temperature to move outside of the dead band.

In a demand response system, it is possible to leverage the remote control of specific loads, and especially of energy storage loads, to provide targeted startup of energy storage loads. In some approaches, load restart is staggered, similarly to the "rolling start-up" approach but more targeted to energy storage loads using the automated demand response infrastructure. In another approach, energy storage loads are restarted by the demand response infrastructure using some reduced power level.

While these approaches have numerous advantages, they also have substantial practical barriers to widespread implementation. They are predicated upon availability of sufficient communication infrastructure to allow the grid operator to perform individualized, targeted load startup. Such advanced communication infrastructure is not yet widely available, especially in residential areas where demand response may be economically impractical. For example, it may not be cost effective to provide individualized communication between the grid operator and each of several hundred thousand residential water heaters in a large city. Even if installed, this communication infrastructure may become unavailable at the critical time as the power outage may cause loss of electrical power to the communication system.

BRIEF SUMMARY

In accordance with some illustrative embodiments disclosed herein, a cold load pickup device is disclosed, which includes a load controller comprising a microprocessor or microcontroller programmed to perform operations including: (i) detecting restoration of power after a power outage on a circuit powering an electric load; (ii) determining a power outage time for the power outage; and (iii) determining a startup delay for the electric load based on the power outage time. A startup delay mechanism, such as a power relay operated by the load controller or switching of the load on/off by the load controller, is configured to apply the startup delay after the detected restoration of power before restarting the electric load. In some embodiments the operation (iii) comprises determining the startup delay for the electric load based on the power outage time and a startup delay versus power outage time curve stored in a non-volatile memory of the load controller.

In accordance with some illustrative embodiments disclosed herein, an apparatus comprises an electric load on a circuit powering the electric load, and a load controller comprising a microprocessor or microcontroller programmed to perform operations including: (i) detecting restoration of power after a power outage on the circuit powering the electric load; (ii) determining a power outage time for the power outage; (iii) determining a startup delay for the electric load based on the power outage time; and (iv) in response to detecting restoration of power, delaying the restart of the electric load by the startup delay and thereafter restarting the electric load. In some embodiments the electric load is an electric water heater. In some embodiments the operation (ii) comprises determining the power outage time based on change in energy stored by the electric load (e.g. water temperature in a water tank of the electric water heater) before and after the power outage.

In accordance with some illustrative embodiments disclosed herein, a cold load pickup method comprises: (i) detecting restoration of power after a power outage on a circuit powering an electric load; (ii) determining a power outage time for the power outage; (iii) determining a startup delay for the electric load based on the power outage time; and (iv) in response to detecting restoration of power, delaying the restart of the electric load by the startup delay and thereafter restarting the electric load.

DETAILED DESCRIPTION

In some cold load pickup techniques disclosed herein, local monitoring at an individual energy storing electrical load is performed to detect when power is restored after a (relatively long) power outage, without any central network control (such as communication with the grid operator). In the example of an electric water heater, a (local) water heater controller detects when power is restored. The controller reads water temperature measurements of water in the water heater storage tank using a thermocouple or other temperature sensor disposed in or on the water tank. This is done as a function of time (at least when power is available) and the readings are stored in a non-volatile memory of the controller that retains its memory contents even when not powered. When the controller detects power is restored, it reads the current water tank temperature and compares it with the water temperature at the time the power was lost. Based on this difference, the duration of the power outage is determined. Numerous variants are contemplated, such as providing a battery-powered internal clock to detect the power outage time, or characterizing the power outage duration in terms of lost thermal energy rather than converting it to a time.

In the case of an extended power outage, such that water in the tank is very cold, the controller may wait some amount of time before re-energizing to reduce the cold load pickup strain on the circuit. The controller estimates the duration of the outage using an approach such as that just described, and applies different lengths of time for restoration delay based on how long the power outage was. For example, if a short outage is detected, it may wait less than a minute to restore power; whereas, if an extended outage is detected, it may wait substantially longer (e.g. 30 minutes to an hour) before restoring power.

The disclosed approaches for softening the cold load pickup process are suitably performed locally, e.g. at the energy storing load. However, the approach is also amenable to coordination with the grid operator if suitable communication infrastructure is available. For example, a restart delay-versus-power outage time curve can be provided by the electrical power utility or power provider, and may be updated occasionally via a wired or wireless communication network (e.g. powerline communication or PLC network, Internet/local WiFi link, or so forth). Advantageously, such an update would typically be done infrequently, for example updating based on the weather forecast (such as providing for longer restart delay of water heaters in colder weather due to the expected higher cold load pickup initial power draw). The local storage-based restart process would be operative even if a demand response or other centralized network control system goes down during the power outage, and could be coordinated with the centralized system once communications are re-established. This facilitates an optimum balance between reducing the cold load pickup impact and fast service restoration. Thus, for example, once communications is re-established after an outage, the load suitably connects back to a central server and receives updated instructions on when to switch on.

Figure 1:
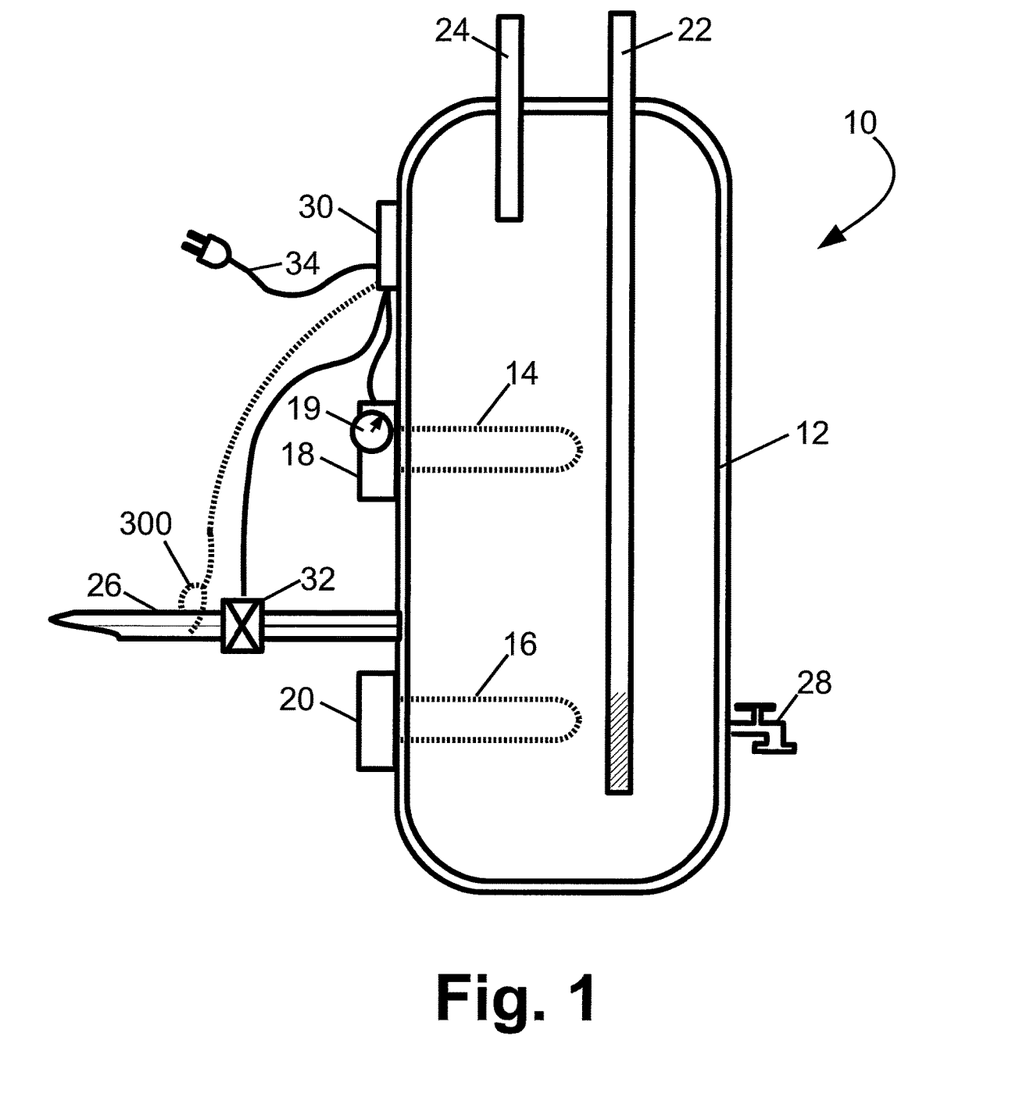
FIG. 1 diagrammatically illustrates a an illustrative energy storing electrical load, namely an electric water heater, further including a load controller to regulate power delivered to the water heater and to control restart after a power outage.

With reference to FIG. 1, an illustrative energy storing electrical load is an electric water heater 10 including a water tank 12, one or more (illustrative two) heater elements 14, 16 immersed in the water contained in the water tank 12 (assuming the tank 12 is filled as in its operational state), and temperature reading elements (e.g. thermocouples, thermistors, or so forth) 18, 20. In a typical design, one of the temperature reading elements, e.g. the temperature reading element 18, includes an integral thermostat 19 that is user-adjustable to set the set point temperature for the water heater 10. The thermostat 19 may be a simple mechanical (e.g. bi-metallic strip) thermostat that implements a dead band around the set point temperature, or the thermostat 19 may be an electronic device; in either case, the thermostat 19 reads the temperature sensor(s) 18, 20, activates the heater element(s) 14, 16 when the water temperature falls below a dead band about the set point, and deactivates the heater elements when the water temperature rises about the dead band.

Cold water flows into the bottom of the tank 12 via a cold feed water inlet line 22, and hot water is extracted from the tank 12 via a hot water outlet line 24. Electrical power to drive the heating elements 14, 16 is delivered via an electrical mains line 26, which may for example deliver 240 VAC power. A drain valve 28 is provided to empty the water tank 12 in order to perform maintenance, decommission or move the electric water heater 10, or so forth. It will be appreciated that the illustrative electric water heater 10 is merely an example, and more generally other electric water heater designs could be employed, and moreover the disclosed cold load pickup techniques can be employed in conjunction with other types of energy storing electrical loads such as HVAC systems, refrigerators, and so forth.

In the illustrative example, cold load pickup techniques disclosed herein are implemented by way of a retrofitted load controller 30 which in the illustrative embodiment is mounted onto the exterior of the hot water tank 12. The load controller 30 is operatively connected with at least one temperature sensor 18 of the water heater 10. To enable the illustrative retrofit load controller 30 to regulate power delivered to the water heater 10, a power regulation device 32 is installed on the mains line 26 to regulate power delivered to the water heater 10. In illustrative examples herein, the power regulation device 32 is a power relay having a closed state in which power is delivered to the water heater 10 and an open state in which power is blocked. The load controller 30 receives power that is not blocked by the power regulation device 32, for example via an illustrative 120 VAC power cord 34, or via a connection with the mains line 26 upstream of the power regulation device 32, or by way of a built-in battery.

It will be appreciated that the retrofit design 30, 32 is an illustrative example. In another contemplated design, the thermostat 19 is an electronic thermostat and the cold load pickup techniques disclosed herein are implemented by way of (re-)programming the thermostat 19.

Figure 2:
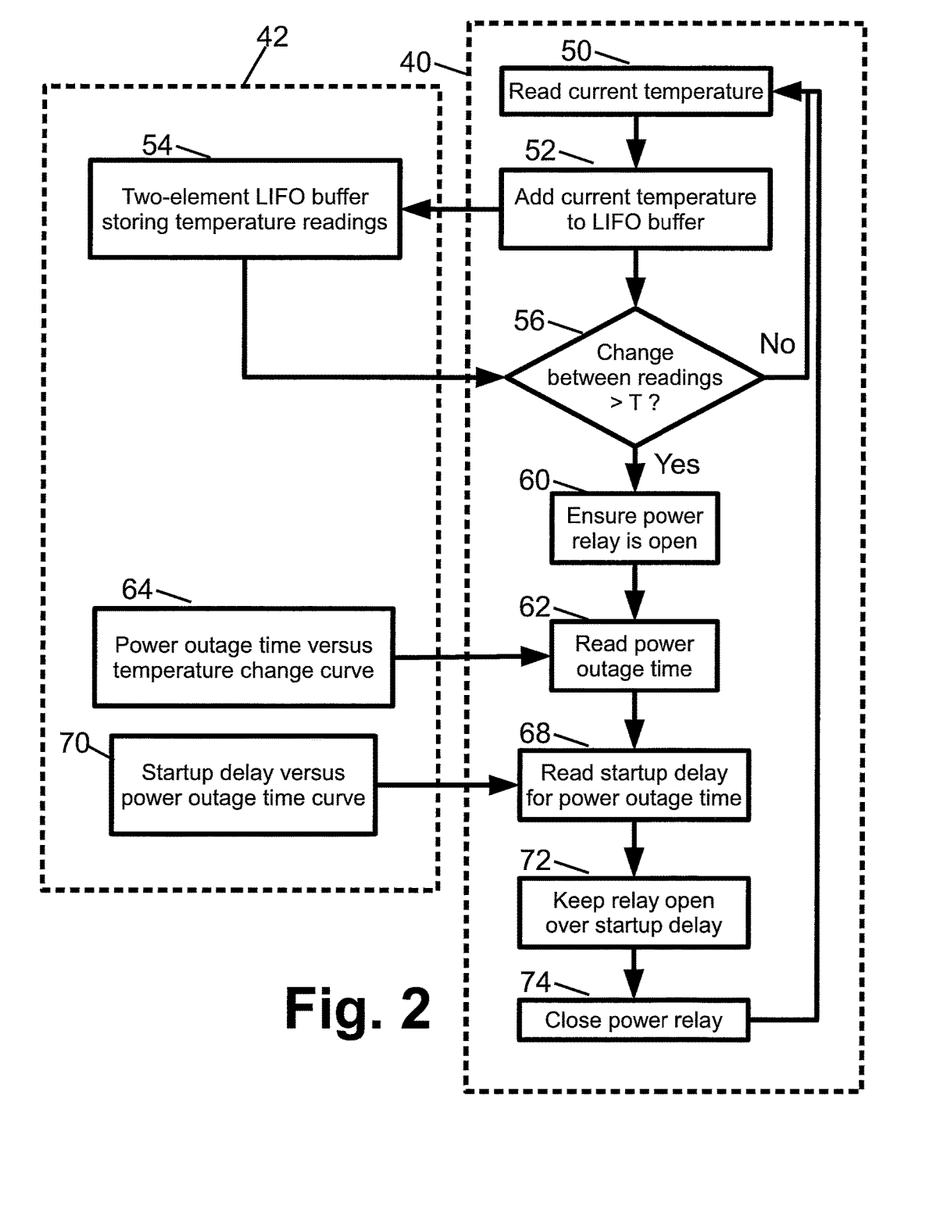
FIG. 2 diagrammatically shows an embodiment of a startup procedure suitably performed under control of the load controller of FIG. 1 upon return of power after a power outage.

With continuing reference to FIG. 1 and with further reference to FIG. 2, an illustrative embodiment of the retrofitted load controller 30 is described. In this embodiment the load controller includes an electronic microprocessor or microcontroller 40 and a non-volatile memory 42 that retains its stored data even in the absence of power. The non-volatile memory 42 may, for example, comprise a flash memory, electronically erasable programmable read only memory (EEPROM), or CMOS RAM memory (CMOS is volatile memory, but when backed up by a CMOS battery it is effectively non-volatile memory and is considered as non-volatile herein).

In the embodiment of FIG. 1, it is assumed that the load controller 30 does not include a battery-powered internal clock and also does not include a battery backup that allows it to operate during a power outage. As such, it is not directly possible to determine a power outage time, that is, the duration of a power outage. However, it is recognized herein that if temperature readings are read on a periodic basis (e.g. once per few seconds, or once per minute) and stored in the non-volatile memory 42, then a power outage can be indirectly detected because "successive" temperature readings (which in this instance are actually separated by the power outage time which is much longer than the designed period reading time interval) will exhibit an abrupt temperature decrease. Moreover, it is recognized herein that the duration of the power outage can be estimated based on how much the temperature dropped between the successive temperature measurements. For example, if the water tank exhibits an exponential temperature decay of the form Temp=$Ae^{-t/\tau}$ then the constants A and $\tau$ can be determined by a calibration (e.g. shutting off power to the water heater 10, measuring the temperature decay, and fitting $Ae^{-t/\tau}$ to the measured data). Then the temperature ratio measured before and after the power outage is $e^{-t_{start}/\tau}/e^{-t_{end}/\tau}$ which can be written as $e^{(t_{end}-t_{start})/\tau}$ and since $\tau$ is a known (calibration) parameter the power outage time ($t_{end}-t_{start}$) can be determined. As another approach, these parameters could be learned by the load controller 30 over time during normal operation and monitoring of the electric water heater 10 for other purposes, such as providing demand response.

Based on the foregoing, in the embodiment of FIG. 2 the microprocessor or microcontroller 40 of the load controller 30 executes the following operations. During normal operation (with no power outage) a loop is performed: temperature is read 50, and added 52 to a two-element last-in-first-out (LIFO) buffer 54 stored in the non-volatile memory 42. In a check operation 56, the change between the last two temperature readings stored in the two-element LIFO buffer 54 is assessed. During normal operation (no power outage), these two readings should be very close to one another, since (for example) if measurements are taken once per minute the temperature drop of water in the tank 12 over a one minute interval should be very small. In this case, process flows back to operation 50 to perform the next temperature reading, e.g. after a one-minute delay. On the other hand, if the check 56 finds that there is a large temperature change (greater than some threshold T), then this indicates that there was a power outage whose power outage time was long enough for the temperature to drop by more than the threshold T. In this case, process flow passes to an operation 60 which ensures that the relay 32 (see FIG. 1) is open. This may already be the case if, for example, the power relay 32 is a "normally open" relay that opens upon removal of a control signal from the load controller 30 (which power would have been removed upon commencement of the power outage). In such a case, the operation 60 may be omitted, as it is already ensured that the relay 32 is open.

With continuing reference to FIGS. 1 and 2, in an operation 62 the power outage time is estimated based on the temperature change between the last two temperature readings (already determined in operation 56). In the illustrative approach, a power outage time-versus-temperature change curve 64 is referenced to determine the power outage time. This can be an empirical curve (e.g. measured by a calibration in which power is shut off to the water heater 10 and temperature measured as a function of time) or based on first principles, e.g. the temperature ratio can be related to the exponential $e^{(t_{end}-t_{start})/\tau}$ under certain assumptions as discussed herein.

Figure 3:
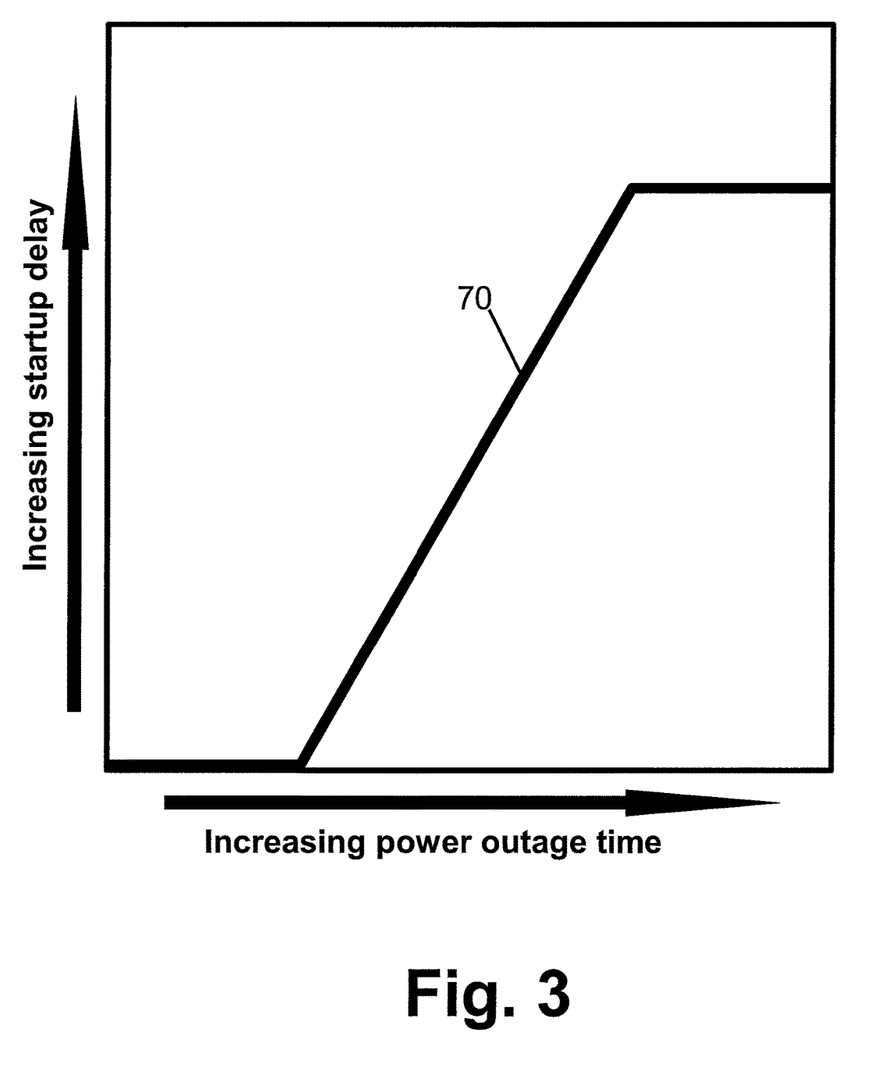
FIG. 3 shows an illustrative example of the startup delay versus power outage time curve employed in the startup procedure of FIG. 2.

With continuing reference to FIGS. 1 and 2 and with further reference to FIG. 3, in an operation 68 the estimated power outage time is used to determine a startup time delay. In the illustrative example, a startup delay versus power outage time curve 70 is consulted for this purpose. FIG. 3 diagrammatically illustrates one such contemplated curve 70. In general, a longer power outage time implies that there will be a greater initial loading on the electric power grid circuit upon reinstatement of power. To reduce this effect, and under the assumption that most energy storing loads will attempt to restart as soon as power is reinstated and attempt to recharge quickly, the curve 70 provides a generally longer startup delay for longer power outage times so that the water heater 10 with the cold load pickup retrofit controller 30 does not further contribute to this initial power draw. For very short power outage times, no startup delay is provided, since in such cases the amount of stored energy dissipation is low and the initial loading is not expected to be a problem. At the other end, for very long power outage times the startup delay reaches some maximum value, corresponding for example to the total recharge time of a typical energy storing device on the circuit.

It is to be appreciated that the illustrative startup delay versus power outage time curve 70 is merely an example. More generally, there is some curve (which may be embodied by a look-up table, mathematical formula, or so forth) that provides a startup delay as a function of the estimated power outage time. The curve may, in some embodiments, be provided by the electric power utility. In such embodiments, the utility preferably has assigned different curves to different energy storing loads with the goal of distributing the cold load pickup power draw over time and, perhaps, geographically. The curve may be different for different types of energy storing loads, and/or for different energy storing loads of the same type. The curve for a given load may be chosen to balance the importance of restarting the load against its impact on the circuit-level cold load pickup process.

For example, an HVAC system may typically have a curve similar to the startup delay versus power outage time curve 70 of FIG. 3. However, the curve for a residence of an elderly person may have a shorter delay since the elderly person may be less able to cope with a long delay before the heating process restarts. Indeed, it is contemplated for the slope of the curve to be reversed in this case, i.e. the delay may become shorter for longer power outage times under the assumption that the elderly person is less able to cope with longer outages and hence needs his or her heat turned back on immediately upon restoration of power after a long power outage.

The HVAC curves may also be adjusted seasonally. Between HVAC and water heater loads, it may be preferable to restart the HVAC systems first in the winter to re-heat homes quickly, with the water heaters being restarted after a longer delay. Seasonal curve adjustments may be implemented, for example, by the grid operator sending new curves to the load controllers via PLC, Internet/WiFi, or another communication pathway.

With particular reference to FIG. 2, after determining the startup delay in operation 68, it is implemented in operation 72 by keeping the relay 32 (FIG. 1) open over the duration of the startup delay, and then in an operation 74 closing the relay 32 to reconnect the electric water heater 10 to the power grid circuit. Flow then transfers back to operation 50 to return to the normal state of monitoring temperature.

Figure 4:
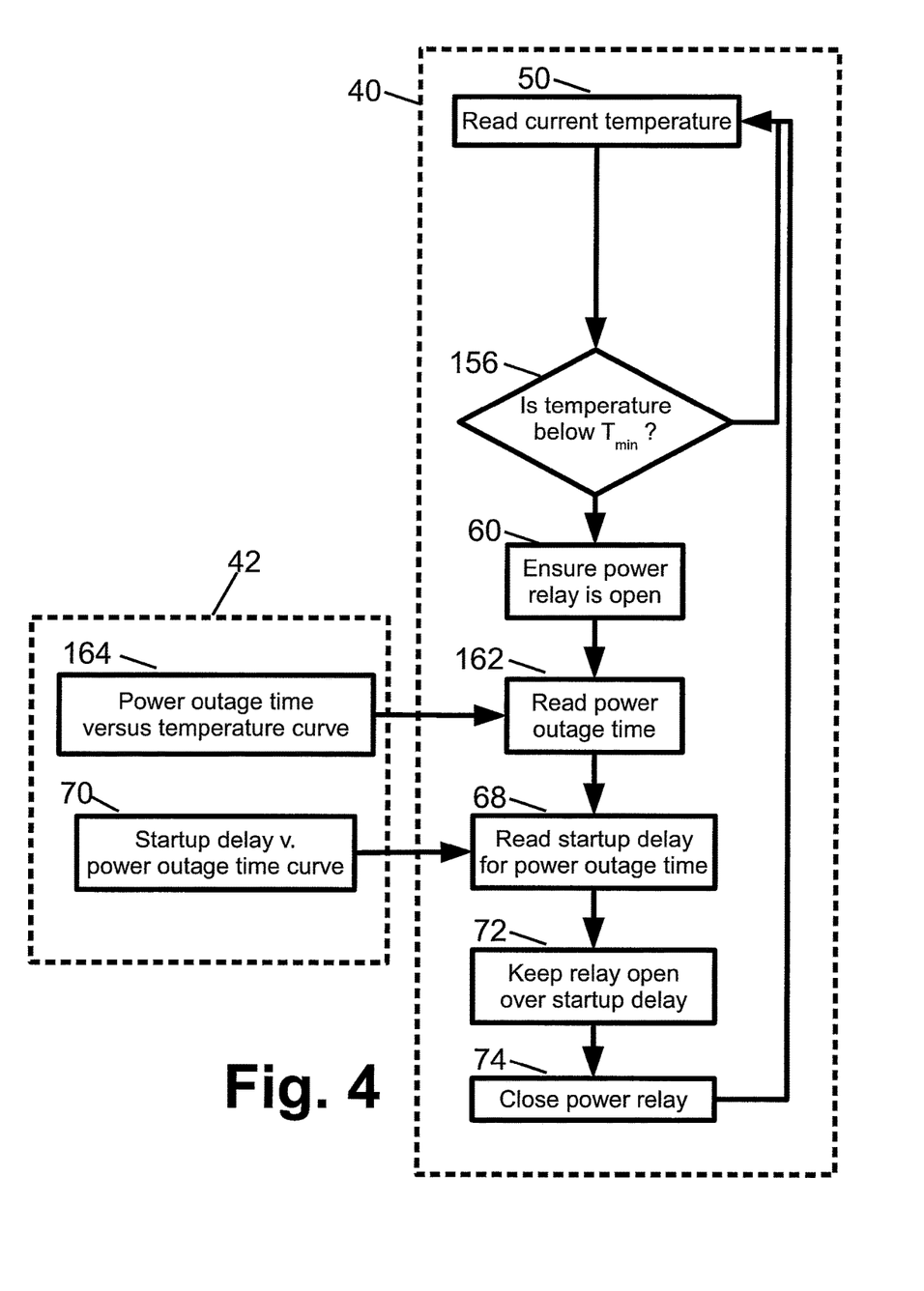
FIGS. 4 and 5 diagrammatically shows additional startup procedure embodiments suitably performed under control of the load controller of FIG. 1 upon return of power after a power outage

With reference now to FIG. 4, a variant embodiment of the process of FIG. 2 is described. This variant recognizes that the water temperature in the hot water tank 12 of the water heater 10 generally should be fairly constant, i.e. within the dead band of the water heater 10 which may be on the order of a few degrees Fahrenheit or less. Moreover, most residential electric water heaters are kept at similar set point temperature values, which vary from water heater to water heater by at most a 10-15° F. or so. If the "normal" water temperature is therefore assumed to be constant, e.g. 120° F., then a power outage will reveal itself by a temperature reading which is well below this normal temperature, e.g. 110° F. or lower. Under these simplifying assumptions, the microprocessor or microcontroller 40 performs a simplified process in which the current temperature is read in operation 50 as in the process of FIG. 2. However, there is no LIFO buffer in the embodiment of FIG. 4, and instead a modified check block 156 determines whether the temperature reading is below a threshold temperature (e.g. 110° F. in the just-mentioned example). If so, the relay is ensured to be open in operation 60 as before. The power outage time is estimated in a modified operation 162 based on a modified power outage time versus temperature (rather than temperature change) curve 164 which effectively "assumes" the temperature before the outage was the assumed "normal" temperature (e.g. 120° C. in the example). The remaining operations 68, 72, 74 are performed as previously described with reference to FIG. 2, with the delay being determined from the curve 70 based on the power outage time estimated in modified operation 162.

In the illustrative embodiments of FIGS. 2 and 4, it is assumed that (1) the load controller does not continue to operate during a power outage due to loss of power, and (2) the load controller has no battery-powered internal clock. Thus, in the embodiments of FIGS. 2 and 4, the power outage, and its time, are inferred indirectly from the cooling of water in the water tank 12 (or, more generally, the power outage and its time are inferred indirectly from dissipation of stored energy in the energy-storing load under control of the load controller).

Further, in the illustrative embodiments of FIGS. 2 and 4 the dissipation of stored energy in the energy-storing load is transformed into a power outage time by way of operations 62, 162. However, this conversion does not need to be to actual time units. The power outage time may be quantified in other ways, such as by the water temperature change (in which case the illustrative startup delay versus power outage time curve 70 would be suitably replaced by a startup delay versus temperature change curve, with temperature change quantifying the estimated power outage time, and the operation 62, 162 would be suitably omitted).

Figure 5:
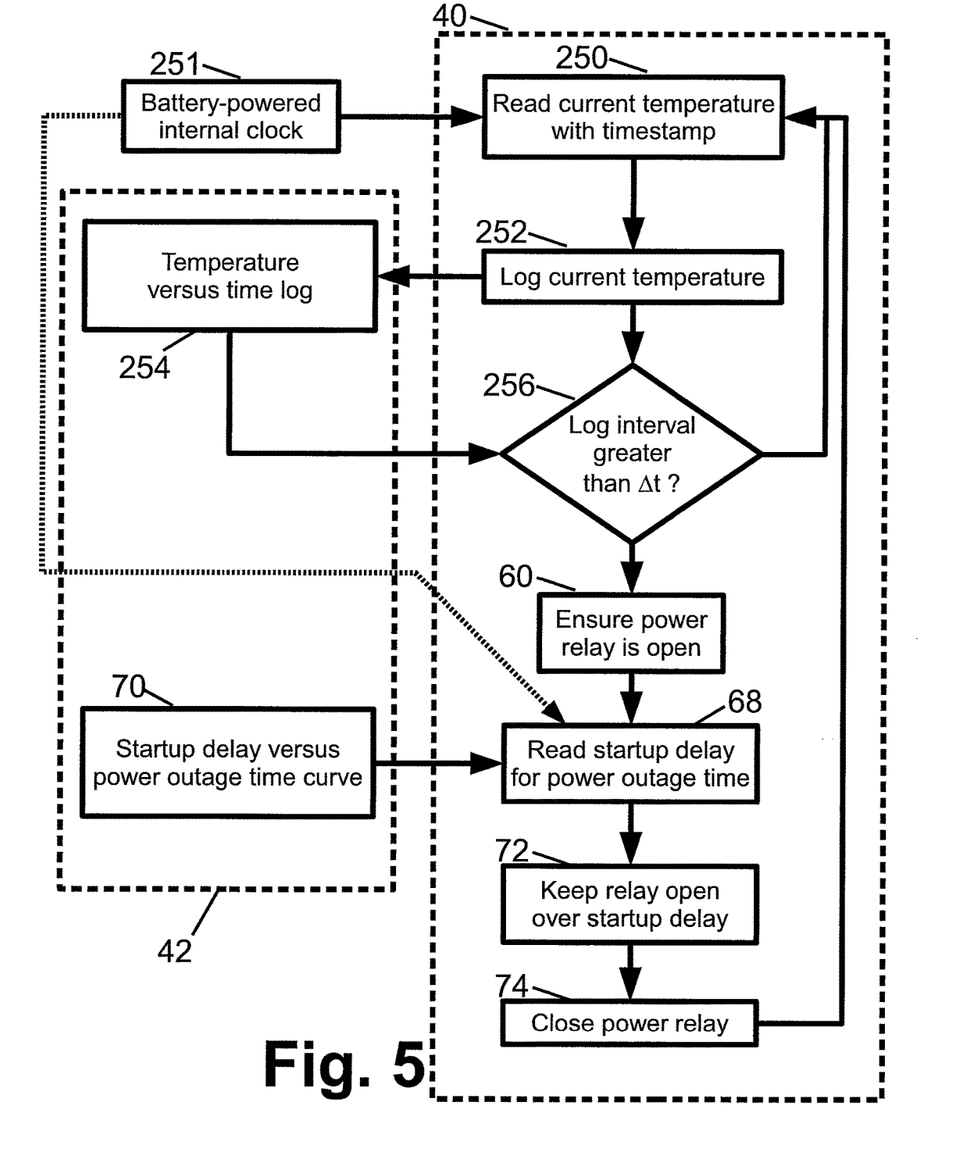

With reference to FIG. 5, in a variant embodiment the temperature readout operation 50 of the embodiment of FIGS. 2 and 4 is replaced with a readout with timestamp operation 250, which is enabled by providing the load controller 30 with a battery-powered internal clock 251 in the embodiment of FIG. 5. In this case, an operation 252 can log current temperature with timestamp in a temperature versus time log 254 stored in the non-volatile memory 42. In this embodiment, the load controller 30 is again assumed to lose power during a power outage (except for continued operation of the battery-powered internal clock 251, so that temperature data logging stops during the power outage. However, in this embodiment because the temperature measurements are timestamped, a check operation 256 can identify a power outage directly, by way of observing successive temperature readings in the log 254 whose time stamps are separated by an interval larger than the temperature readout interval. For example, a power outage can be detected by the interval between successive time stamps being greater than some threshold Δt. In this case, the power outage time is directly obtained as the (too large) time interval between successive temperature readings. When a power outage is detected at check 256, the optional power relay open operation 60 is performed (again, this may not be needed if the relay 32 automatically opens upon loss of control signal from the controller 30) and in the operation 68 the power outage time (again, directly read from the time-stamped log 254 in this embodiment) is used to obtain the startup delay from the curve 70. As indicated by a dotted line in FIG. 5, in this embodiment it is also contemplated to adjust the startup delay based on time-of-day information obtained from the available internal clock 251—for example, a shorter delay in restarting a water heater might be appropriate if the current time is the morning or evening when residents tend to use hot water for showering, dishwashing, et cetera. The remaining operations 72, 74 are performed as already described with reference to FIGS. 2 and 4.

In the embodiment of FIG. 5, timestamped temperatures are logged. More generally, it is sufficient to log timestamps in a non-volatile memory. For example, in a simplified variant (not illustrated) of the approach of FIG. 5, no temperature measurements are made so that operation 250 is omitted; the operation 252 is reduced to writing the current time to non-volatile memory, and the check operation 256 then is performed at some fixed time interval (e.g. a few seconds) after the write operation and compares the current time of the clock 251 against the last time written to non-volatile memory. If there is a power outage, then this modified check operation will detect it as the current time of the clock 251 being much later than the last time written.

In yet another example (not illustrated), the load controller 30 may be battery powered or have battery backup and thereby remain operational during a power outage. In such an embodiment, the load controller may optionally further include a measurement device, such as a voltmeter 300 (shown in dotted lines in FIG. 1), that directly measures voltage on the mains 26. In this case, the load controller 30 directly detects a power outage as a loss of voltage on the mains 26, and determines the power outage time using the internal clock 251. The relay open operation 60 can be performed immediately upon detecting the loss of mains power so as to isolate the load from the power circuit. When mains power is detected to be restored, the power outage time is recorded and the startup delay lookup 68, startup delay implementation 72, and relay closing operation 74 are then performed as already described.

Disclosed cold load pickup techniques provide a startup delay after a power outage for an energy-storing electric load, in which the startup delay is chosen based on the power outage time and a locally stored startup delay versus power outage time curve. In various illustrative embodiments described herein, the power outage time may be estimated indirectly based on dissipation of energy stored in the device (FIGS. 2 and 4). In other illustrative embodiments described herein, the battery-powered internal clock 251 is provided (FIG. 5), so that the power outage delay may be directly measured using the clock 251. If the clock 251 is provided but the controller 30 itself loses power during the power outage, then the power outage time may be measured by detecting a time interval over which a repetitive timestamp writing operation performed by the load controller 30 was interrupted (FIG. 5). On the other hand, if the load controller 30 remains powered during the power outage, then both the clock 251 and the mains voltmeter 300 may be provided, so that the power outage time is directly measured as the time interval over which the mains 26 lost voltage.

Advantageously, the disclosed cold load pickup techniques can be implemented entirely locally, at the energy-storing electric load, and do not require any central infrastructure. On the other hand, if central infrastructure is provided it can be advantageously leveraged, for example to occasionally update the stored startup delay versus power outage time curve. For example, different startup delay may be preferably used in the winter season versus the summer season, and accordingly a seasonally adjusted instance of the startup delay versus power outage time curve 70 may be sent out as appropriate.

It will further be appreciated that the disclosed cold load pickup techniques may be embodied as a non-transitory storage medium storing instructions readable and executable by the microprocessor or microcontroller 40 of the load controller 30 to perform the operations described herein. The non-transitory storage medium may, for example, comprise a hard disk drive or other magnetic storage medium; a read-only-memory (ROM), erasable programmable read-only-memory (EPROM), flash memory, or other electronic storage medium; an optical disk or other optical storage medium; various combinations thereof; or so forth.

The preferred embodiments have been illustrated and described. Obviously, modifications and alterations will occur to others upon reading and understanding the preceding detailed description. It is intended that the invention be construed as including all such modifications and alterations insofar as they come within the scope of the appended claims or the equivalents thereof.

The invention claimed is:

1. An apparatus comprising:
   an electric load on a circuit powering the electric load, the electric load storing thermal energy by heating or cooling a thermal mass; and
   a load controller comprising a microprocessor or microcontroller programmed to perform operations including:
   (i) detecting restoration of power after a power outage on the circuit powering the electric load;
   (ii) determining a power outage time for the power outage via measuring a change in temperature of the thermal mass over the power outage;
   (iii) determining a startup delay for the electric load based on the power outage time; and
   (iv) in response to detecting restoration of power, delaying the restart of the electric load by the startup delay and thereafter restarting the electric load.

2. The apparatus of claim 1 wherein the electric load is an electric water heater.

3. The apparatus of claim 2 wherein the operation (ii) comprises determining the power outage time based on change in water temperature of water in a water tank of the electric water heater before and after the power outage.

4. The apparatus of claim 1 wherein the operation (ii) comprises determining the power outage time based on change in energy stored by the electric load before and after the power outage.

5. The apparatus of claim 1 wherein operation (iii) quantifies the power outage time as one of (a) a time interval and (b) the measured temperature change of the thermal mass over the power outage.

6. A cold load pickup method comprising:
   (i) operating the electric load to store thermal energy by heating or cooling a thermal mass;
   (ii) detecting restoration of power after a power outage on a circuit powering the electric load;
   (iii) determining a power outage time for the power outage via measuring a change in temperature of the thermal mass over the power outage;
   (iv) determining a startup delay for the electric load based on the power outage time; and
   (v) in response to detecting restoration of power, delaying the restart of the electric load by the startup delay and thereafter restarting the electric load.

7. A cold load pickup method comprising:
   (i) detecting, via a load controller of an electric load, restoration of power after a power outage on a circuit powering the electric load;

(ii) determining a power outage time for the power outage;
(iii) determining the startup delay for the electric load based on the power outage time and a startup delay versus power outage time curve stored in a non-volatile memory of the load controller; and
(iv) in response to detecting restoration of power, delaying the restart of the electric load by the startup delay and thereafter restarting the electric load.

* * * * *